(12) United States Patent
Terada et al.

(10) Patent No.: US 9,487,242 B2
(45) Date of Patent: Nov. 8, 2016

(54) VEHICLE BODY LOWER PORTION STRUCTURE

(71) Applicant: TOYOTA JIDOSHA KABUSHIKI KAISHA, Toyota-shi, Aichi (JP)

(72) Inventors: Shin Terada, Toyota (JP); Kentaro Nakamura, Toyota (JP); Koki Ikeda, Toyota (JP); Shinya Kamimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/765,276

(22) PCT Filed: May 23, 2014

(86) PCT No.: PCT/JP2014/063737
§ 371 (c)(1),
(2) Date: Jul. 31, 2015

(87) PCT Pub. No.: WO2014/208233
PCT Pub. Date: Dec. 31, 2014

(65) Prior Publication Data
US 2016/0107704 A1    Apr. 21, 2016

(30) Foreign Application Priority Data
Jun. 28, 2013    (JP) .................... 2013-137428

(51) Int. Cl.
*B60K 1/04*    (2006.01)
*B62D 25/20*    (2006.01)
*B62D 27/02*    (2006.01)

(52) U.S. Cl.
CPC ............... *B62D 25/20* (2013.01); *B60K 1/04* (2013.01); *B62D 27/026* (2013.01); *B60K 2001/0438* (2013.01); *B60Y 2306/01* (2013.01)

(58) Field of Classification Search
CPC .. B60K 1/00; B60K 1/04; B60K 2001/0438; B60K 2001/0472; H01M 2/1083; B62D 25/20
See application file for complete search history.

(56) References Cited

U.S. PATENT DOCUMENTS

| | | | | |
|---|---|---|---|---|
| 6,040,080 | A | * | 3/2000 | Minami .................... B60K 1/04 429/100 |
| 2012/0021301 | A1 | * | 1/2012 | Ohashi ..................... B60K 1/04 429/400 |
| 2015/0174996 | A1 | * | 6/2015 | Ikeda ....................... B60K 1/04 180/68.5 |

FOREIGN PATENT DOCUMENTS

| | | |
|---|---|---|
| JP | H07-81623 A | 3/1995 |
| JP | H10-162797 A | 6/1998 |
| JP | 2001-268717 A | 9/2001 |
| WO | 2010/137150 A1 | 12/2010 |

* cited by examiner

*Primary Examiner* — Bryan Evans
(74) *Attorney, Agent, or Firm* — Oliff PLC

(57) ABSTRACT

A vehicle body lower portion structure that may prevent or suppress an occurrence of cracks in a support plate even if a load from an obstacle on a road surface is inputted at an end portion of the support plate. Support portions are configured at a stack frame. Lower faces of flange portions of a metal plate member are fixed to the support portions via adhesive layers. Extended end portions are formed extending from the support portions at a front end portion and a rear end portion of the stack frame. At each extended end portion of the stack frame, an inclined portion is formed. The inclined portion is inflected toward a vehicle body upper side from a projected portion of the support portion, and is inclined to a side away from the flange portion of the metal plate member.

3 Claims, 3 Drawing Sheets

VEHICLE BODY LOWER PORTION STRUCTURE

TECHNICAL FIELD

The present invention relates to a vehicle body lower portion structure.

BACKGROUND ART

A vehicle body lower portion has a structure in which a loading member disposed below a floor is placed on and fixed to a support plate, which support is formed of a fiber-reinforced resin material (for example, see Patent Document 1).

RELATED ART REFERENCES

Patent References

Patent Document 1: Japanese Patent Application Laid-Open (JP-A) No. H10-162797

SUMMARY OF INVENTION

However, fiber ends are exposed at an end face of the support plate. Therefore, when a load from an obstacle on a road surface is inputted at the end face of the support plate, cracks may occur in the support plate.

An object of the present invention is to provide a vehicle body lower portion structure that may prevent or suppress an occurrence of cracks in a support plate even if a load from an obstacle on a road surface is inputted at an end face of a support plate.

A vehicle body lower portion structure according to a first aspect of the present invention includes: A vehicle body lower portion structure comprising: a loading member disposed below a floor of a vehicle; and a support plate including a flat plate-shaped support portion that is formed in a plate shape of a fiber-reinforced resin material, an attachment portion of the loading member being placed on and fixed to the support portion, and an extended end portion extending from the support portion, an inclined portion being formed at the extended end portion, the inclined portion being inflected toward a vehicle body upper side from the support portion or a projected portion of the support portion, and the inclined portion being inclined to a side away from the attachment portion of the loading member.

According to the structure described above, the loading member is disposed below the floor of the vehicle, and the attachment portion of the loading member is placed on and fixed to the support portion of the support plate. The support plate is provided with the extended end portion that is extended from the flat plate-shaped support portion. The support plate is formed in the plate shape of the fiber-reinforced resin material. The inclined portion is formed at the extended end portion. The inclined portion is inflected toward the vehicle body upper side from the support portion or the projected portion thereof, and is inclined to the side away from the attachment portion of the loading member. Therefore, for example, if the extended end portion strikes against an obstacle on a road surface and a load is inputted thereto at the height of the support portion, the support plate may receive the load at the lower face of the inclined portion rather than at an end face of the extended end portion. As a result, the formation of cracks in the support plate from the end face of the extended end portion is prevented or suppressed. Further, when the lower face of the inclined portion strikes against the obstacle on the road surface and the load is inputted at the lower face of the inclined portion, the lower face of the inclined portion acts to ride over the obstacle on the road surface. If the support plate is lifted up, the load on the support plate is relieved. Consequently, deformation of the support plate or the like is suppressed.

In a second aspect of the present invention, in the vehicle body lower portion structure according to the first aspect, an end face of the extended end portion faces toward the vehicle body upper side.

According to the structure described above, the end face of the extended end portion faces toward the vehicle body upper side. Therefore, regardless of the height of an obstacle on a road surface that strikes against the extended end portion, the input of a load to the end face of the extended end portion is avoided.

In a third aspect of the present invention, in the vehicle body lower portion structure according to the first aspect or the second aspect, a lower face of the attachment portion of the loading member is fixed to the support portion of the support plate via an adhesive layer, and an upper end of the inclined portion is configured to be disposed at a height that is at the vehicle body upper side relative to an upper end of the adhesive layer.

According to the structure described above, the lower face of the attachment portion of the loading member is fixed to the support portion of the support plate via the adhesive layer, and the upper end of the inclined portion is configured to be disposed at a height that is at the vehicle body upper side relative to the upper end of the adhesive layer. Therefore, for example, if an upper end portion of an obstacle on a road surface is at the same height as the upper end of the adhesive layer, the obstacle on the road surface strikes against the lower face of the inclined portion rather than an end face of the adhesive layer. Therefore, an occurrence of an obstacle on a road surface striking against the end face of the extended end portion or the end face of the adhesive layer may be avoided.

In a fourth aspect of the present invention, in the vehicle body lower portion structure according to the third aspect, a filling portion is provided that is interposed between the inclined portion and the attachment portion of the loading member, and that is joined together with the adhesive layer.

According to the structure described above, the filling portion is provided that is interposed between the inclined portion and the attachment portion of the loading member, and that is joined together with the adhesive layer. Thus, for example, when an obstacle on a road surface strikes against the lower face of the inclined portion, the inputted load is transmitted from the inclined portion through the filling portion to the side at which the attachment portion of the loading member is disposed. Therefore, deformation of the inclined portion is suppressed. Further, if the lower face of the inclined portion rides over the obstacle on the road surface due to deformation of the inclined portion being suppressed, the support portion is displaced diagonally upward and a compression force acts on the adhesive layer. Therefore, separation of the support portion from the attachment portion of the loading member is prevented or effectively suppressed.

In a fifth aspect of the present invention, in the vehicle body lower portion structure according to any one of the first to fourth aspects, the inclined portion is formed by a curved portion being formed at the extended end portion, the curved portion being inflected in a curve shape from the support portion or the projected portion of the support portion, and a lower face side of the curved portion being the diametric dimension outer side thereof, and an orientation direction of fibers arranged in the curved portion is configured to be along a curvature direction of the curved portion.

According to the structure described above, an inflection region that is inflected from the support portion or a projected portion thereof is formed as the curved portion that is inflected in a curve shape with the lower face side thereof being at the diametric direction outer side. Therefore, the fibers may be more uniformly arranged than in, for example, an inflection region that is sharply bent. Moreover, because the orientation direction of the fibers arranged in the curved portion is configured to be along the curvature direction of the curved portion, bending strength of the curved portion is improved.

As described hereabove, according to the vehicle body lower portion structure in accordance with the first aspect of the present invention, an excellent effect is provided in that, even if a load from an obstacle on a road surface is inputted at the end portion of the support plate, an occurrence of cracks in the support plate may be prevented or suppressed.

According to the vehicle body lower portion structure in accordance with the second aspect of the present invention, an excellent effect is provided in that, regardless of the height of an obstacle on a road surface that strikes against the extended end portion, an occurrence of cracks from the end face of the extended end portion may be prevented or suppressed.

According to the vehicle body lower portion structure in accordance with the third aspect of the present invention, an excellent effect is provided in that, even if an upper end portion of an obstacle on a road surface is at the same height as the upper end of the adhesive layer, a strike of the obstacle on the road surface against the end face of the extended end portion or the end face of the adhesive layer may be avoided, and the formation of cracks from the end face of the extended end portion or the end face of the adhesive layer may be prevented or suppressed.

According to the vehicle body lower portion structure in accordance with the fourth aspect of the present invention, excellent effects are provided in that, when an obstacle on a road surface strikes against the lower face of the inclined portion, deformation of the support plate may be suppressed and separation of the support plate from the attachment portion of the loading member may be prevented or effectively suppressed.

According to the vehicle body lower portion structure in accordance with the fifth aspect of the present invention, excellent effects are provided in that bending strength of the curved portion may be improved by the configuration of the fibers arranged in the curved portion, and in that deformation of the curved portion when a load is inputted at the inclined portion may be suppressed.

DESCRIPTION OF EMBODIMENTS

Figure 1:
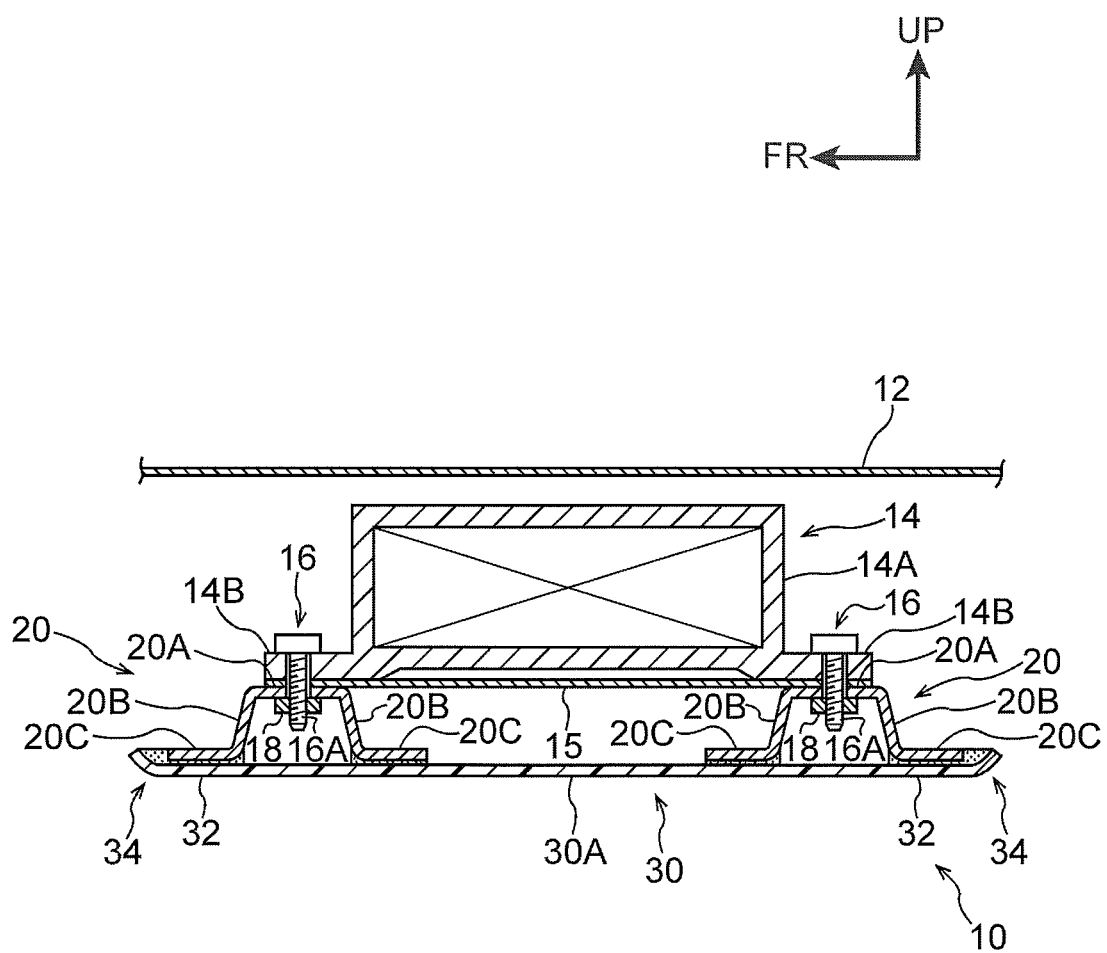
FIG. 1 is a side sectional diagram (a sectional view taken along line 1-1 of FIG. 2) showing a vehicle body lower portion structure in accordance with an exemplary embodiment of the present invention, in a state seen from a vehicle body width direction outer side.
Figure 2:
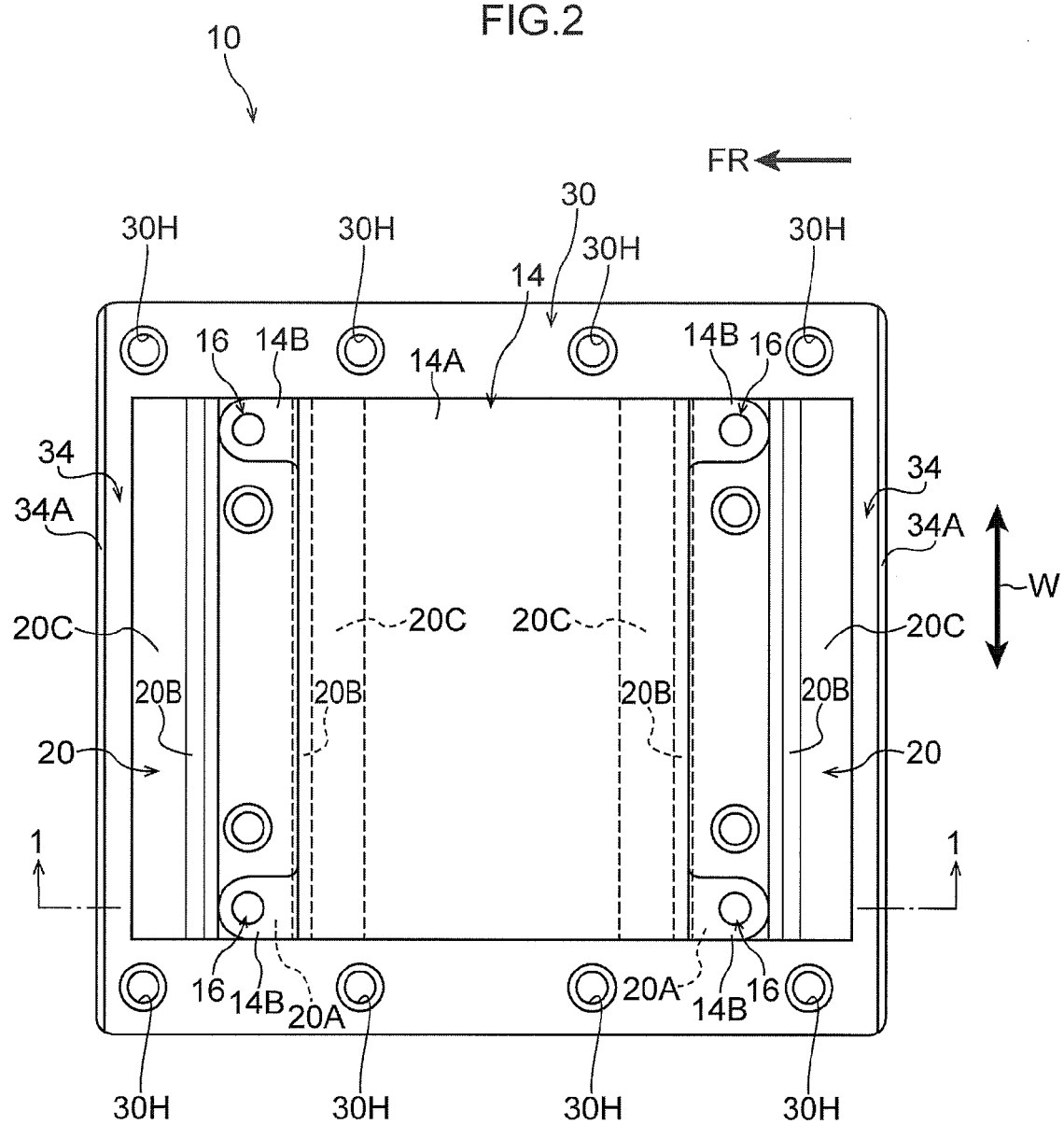
FIG. 2 is a plan view showing the vehicle body lower portion structure in a state seen from the vehicle body upper side.
Figure 3:
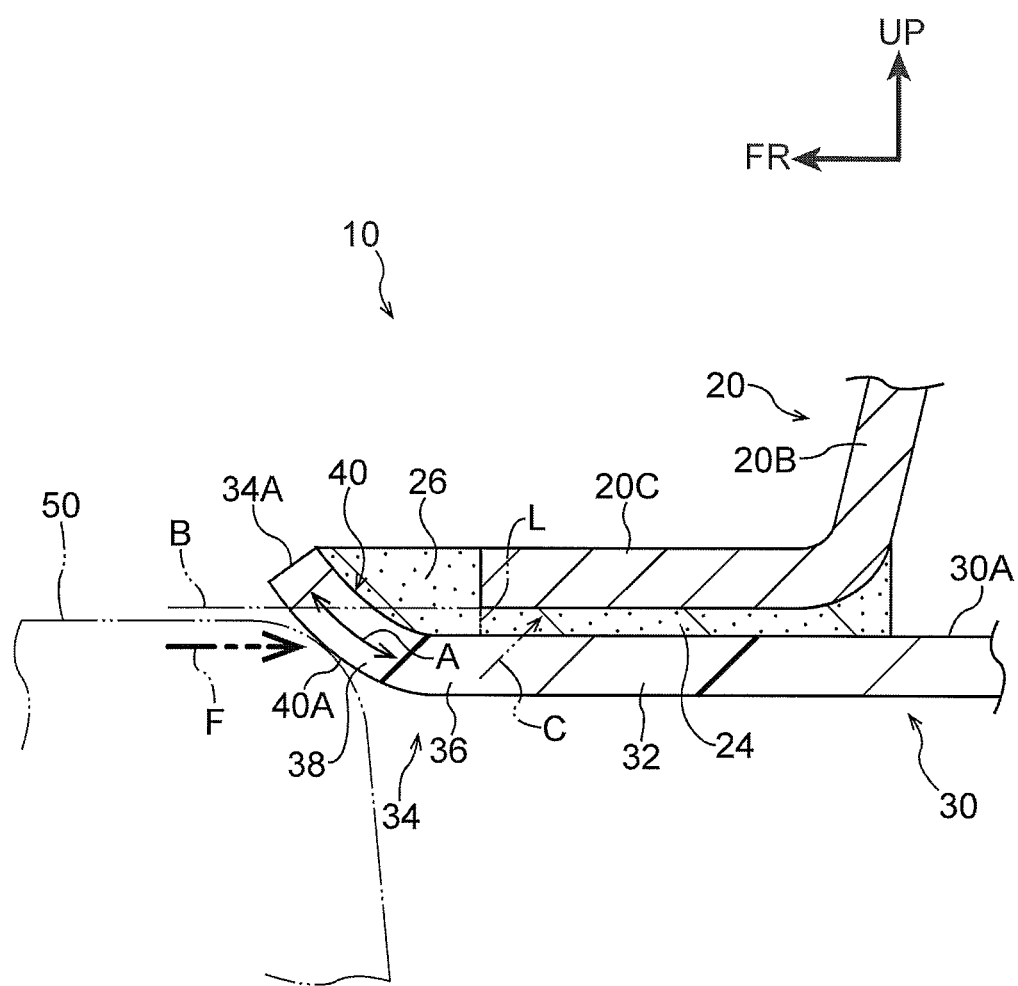
FIG. 3 is a side sectional diagram showing an enlargement of a front end portion of a stack frame in FIG. 1 and neighboring portions.

A vehicle body lower portion structure according to an exemplary embodiment of the present invention is described using FIG. 1 to FIG. 3. An arrow FR that is shown as appropriate in these drawings indicates a vehicle body forward side, an arrow UP indicates a vehicle body upward side, and an arrow W indicates a vehicle body width direction. References to front and rear directions in the following descriptions refer to the same directions as the vehicle body front and rear direction.

Structure of the Exemplary Embodiment

FIG. 1 shows a side sectional diagram of a vehicle body lower portion structure 10 according to the exemplary embodiment of the present invention in a state seen from the vehicle body width direction outer side. FIG. 2 shows a plan view of a state in which the vehicle body lower portion structure 10 is seen from the vehicle body upper side. FIG. 1 is a sectional diagram taken along line 1-1 of FIG. 2. The vehicle body according to the present exemplary embodiment is the vehicle body of an electric car (a vehicle).

As shown in FIG. 1, a stack unit 14 is mounted at the vehicle body lower side of a floor panel 12 that structures a vehicle body floor of the electric car (that is, below a floor of the vehicle). As shown in FIG. 1 and FIG. 2, an exterior portion 14A of the stack unit 14 is formed in a rectangular box shape. Flange portions 14B are formed protruding in the vehicle body front and rear direction from both side portions of a front end portion and a rear end portion of the exterior portion 14A. The exterior portion 14A and the flange portions 14B are formed of metal in the present exemplary embodiment but may be formed of resin. As shown in FIG. 1, the flange portions 14B are superposed with a plate 15 that is disposed at the lower face side of the stack unit 14. The flange portions 14B and the plate 15 are fastened by bolts to top plate portions 20A of metal plate members 20 that serve as loading members, which are fabricated of metal. That is, male threaded portions 16A of bolts 16 penetrate through the flange portions 14B, the plate 15 and the top plate portions 20A of the metal plate members 20 from the vehicle body upper side thereof, and the male threaded portions 16A are screwed into nuts 18 that are disposed at the lower face sides of the top plate portions 20A of the metal plate members 20.

Each metal plate member 20 extends in the vehicle body width direction (see FIG. 2) and is formed in a hat shape in a vehicle body side view. The metal plate member 20 is provided with the top plate portion 20A, side plate portions 20B and flange portions 20C. The top plate portion 20A structures an upper face of the metal plate member 20. The side plate portions 20B are inflected at obtuse angles and descend to the vehicle body lower side from front and rear ends of the top plate portion 20A. The flange portions 20C, which serve as attachment portions, are inflected from lower ends of the side plate portions 20B and extend in directions away from one another. The flange portions 20C of the metal plate members 20 are placed on and fixed to an upper face of a stack frame 30, which serves as a support plate.

The stack frame 30 is formed in a plate shape of a fiber-reinforced resin material that has lower stiffness than the flange portions 20C of the metal plate members 20. The fiber-reinforced resin material is a compound material of fibers and resin. Fibers such as glass fibers, carbon fibers and the like may be employed as the fibers. In the fiber-reinforced resin material according to the present exemplary embodiment, as an example, non-continuous fibers are employed rather than a fabric of fibers. However, a fabric of fibers may be employed in the fiber-reinforced resin material.

As illustrated in FIG. 2, the stack frame 30 is formed in a plate shape. Attachment holes 30H for under-members (not shown in the drawings) are plurally formed in the stack frame 30 at both side portions of the vehicle body width direction. The attachment holes 30H are spaced in the vehicle body front and rear direction. The under-members extend in the vehicle body front and rear direction at both sides of the vehicle body lower portion, and are joined to the lower face of the floor panel 12 (see FIG. 1).

FIG. 3 shows a side sectional diagram in which a front end portion of the stack frame 30 and neighboring portions are enlarged. As shown in FIG. 3, support portions 32 are configured in a flat plate-shaped general portion 30A of the stack frame 30. The support portions 32 are fixed to lower faces of the flange portions 20C of the metal plate members 20, via adhesive layers 24. Extended end portions 34 that are extended from the support portions 32 are formed at the front end portion and a rear end portion of the stack frame 30 (see FIG. 1).

A curved portion 38 is formed at each extended end portion 34. The curved portion 38 is inflected in a curved shape, with the lower face side being the diametric direction outer side, from a projected portion 36 of the support portion 32. The curved portion 38 is formed by a bending process that employs a molding die. The region that forms the curved portion 38 is stretched during the molding. Therefore, the fibers therein are arranged along the direction of the stretching. That is, an orientation direction of the fibers arranged in the curved portion 38 (see arrow A) is configured to be along the curvature direction of the curved portion 38. An inclined portion 40 is formed by the formation of the curved portion 38 at the extended end portion 34. The inclined portion 40 is curved and inclined toward the vehicle body upper side to the side away from the flange portion 20C of the metal plate member 20 (diagonally to the vehicle body upper-forward side in FIG. 3). That is, in the present exemplary embodiment, the curved portion 38 coincides with the inclined portion 40. The inclined portion 40 is more sharply inclined closer to the upper end side thereof.

An end face 34A of the extended end portion 34 is structured by an end face of the inclined portion 40. The end face 34A faces toward the vehicle body upper side and to the side away from the flange portion 20C of the metal plate member 20 (diagonally to the vehicle body upper-forward side in FIG. 3). The upper end of the inclined portion 40 is configured to be disposed at a height that is at the vehicle body upper side relative to an upper end of the adhesive layer 24 (the height of which upper end is represented by the two-dot chain line B). In more concrete terms, the upper end of the inclined portion 40 is configured to be disposed at the height of an upper face of the flange portion 20C of the metal plate member 20.

In the present exemplary embodiment, a filling portion 26 is provided. The filling portion 26 is interposed between the each inclined portion 40 and the flange portion 20C of the metal plate member 20, and is joined together with the adhesive layer 24. In the present exemplary embodiment, the filling portion 26 is constituted by an adhesive the same as an adhesive of the adhesive layer 24. Thus, the filling portion 26 is in a state in which the two adhesives are integrated and hardened (a solid state). In FIG. 3, a notional boundary line between the adhesive layer 24, which is between the flange portion 20C of the metal plate member 20 and the support portion 32 of the stack frame 30, and the filling portion 26 is represented by a two-dot chain line L. An upper face of the filling portion 26 is aligned with the upper end of the inclined portion 40 and the upper face of the flange portion 20C of the metal plate member 20.

Operation and Effects of the Exemplary Embodiment

Now, operation and effects of the above exemplary embodiment are described.

In the present exemplary embodiment, the inclined portion 40 is formed at each extended end portion 34 of the stack frame 30. The inclined portion 40 is inflected toward the vehicle body upper side from the projected portion 36 of the support portion 32 and is inclined to the side away from the flange portion 20C of the metal plate member 20. Therefore, for example, if the extended end portion 34 strikes against an obstacle 50 on a road surface at the height of the support portion 32 and a load F in the horizontal direction is inputted to the extended end portion 34, the stack frame 30 may receive the load F at the lower face 40A of the inclined portion 40 rather than at the end face 34A of the extended end portion 34. As a result, the formation of cracks from the end face 34A of the extended end portion 34 of the stack frame 30 is prevented or suppressed. Further, when the lower face 40A of the inclined portion 40 strikes against the obstacle 50 on the road surface and the load F is inputted to the lower face 40A of the inclined portion 40, the lower face 40A of the inclined portion 40 acts to ride over the obstacle 50 on the road surface. If the stack frame 30 is lifted up (not shown in the drawings), the load F on the stack frame 30 is relieved. Consequently, deformation of the stack frame 30 or the like is suppressed.

In the present exemplary embodiment, the upper end of the inclined portion 40 is configured to be disposed at a height that is at the vehicle body upper side relative to the upper end of the adhesive layer 24. Therefore, even if an upper end portion of the obstacle 50 on the road surface is at the height level of the upper end of the adhesive layer 24, the obstacle 50 strikes against the lower face 40A of the inclined portion 40 rather than the adhesive layer 24. Therefore, an occurrence of the obstacle 50 on the road surface striking against the end face 34A of the extended end portion 34 or the adhesive layer 24 may be avoided. Furthermore, in the present exemplary embodiment, the end face 34A of the extended end portion 34 faces toward the vehicle body upper side. Consequently, input of the load to the end face 34A of the extended end portion 34 is avoided regardless of the height of the obstacle 50 striking against the extended end portion 34. Thus, an occurrence of cracks from the end face 34A of the extended end portion 34 or the adhesive layer 24 may be prevented or suppressed.

In the present exemplary embodiment, the filling portion 26 is provided. The filling portion 26 is interposed between the inclined portion 40 and the flange portion 20C of the metal plate member 20, and is joined together with the adhesive layer 24. Thus, when the obstacle 50 on the road surface strikes against the lower face 40A of the inclined portion 40, the inputted load F is transmitted from the inclined portion 40 through the filling portion 26 to the side at which the metal plate member 20 is disposed. Therefore, deformation of the inclined portion 40 is suppressed. Further, if the lower face 40A of the inclined portion 40 rides over the obstacle 50 on the road surface (not shown in the drawings) due to deformation of the inclined portion 40 being suppressed, the support portion 32 is displaced diagonally upward (see the direction of arrow C), and a compression force acts on the adhesive layer 24. Therefore, separation of the support portion 32 from the flange portion 20C of the metal plate member 20 (detachment of a joining portion) is prevented or effectively suppressed.

In the present exemplary embodiment, an inflection region that is inflected from the projected portion 36 of the support portion 32 is formed as the curved portion 38 that is inflected in a curve shape with the lower face side thereof being at the diametric direction outer side. Therefore, the fibers may be more uniformly arranged than in, for example, an inflection region that is sharply bent. Moreover, because the orientation direction of the fibers arranged in the curved portion 38 (see the direction of arrow A) is configured to be along the curvature direction of the curved portion 38, bending strength of the curved portion 38 is improved. Therefore, deformation of the curved portion 38 when the load F is inputted to the inclined portion 40 may be suppressed.

As described hereabove, according to the vehicle body lower portion structure 10 in accordance with the present exemplary embodiment, even if the load F from the obstacle 50 on the road surface is inputted at the extended end portion 34 of the stack frame 30, an occurrence of cracks in the stack frame 30 may be prevented or suppressed.

Supplementary Descriptions of the Exemplary Embodiment

As a variant example of the exemplary embodiment described above, the lower faces of the flange portions (14B) of the stack unit (14) may be fixed to the support portions (32) of the stack frame (30) via the adhesive layers (24). That is, attachment portions of the loading members to the support plate may be alternative attachment portions of the loading members such as, for example, the flange portions (14B) of the stack unit (14) or the like.

As a further variant example of the above exemplary embodiment, inclined portions may be formed at the extended end portions (34) of the stack frame (30) that are each inflected from the support portion (32) toward the vehicle body upper side and inclined to the side away from the attachment portion of the loading member (the flange portion 20C of the metal plate member 20). Furthermore, at the extended end portions (34), curved portions may be formed that are inflected from the support portions (32) in curve shapes with the lower face sides thereof being the diametric direction outer sides.

As a further variant example of the above exemplary embodiment, inclined portions may be formed at the extended end portions (34) of the stack frame (30) which inclined portions are each sharply bent from the support portion (32) or the projected portion (36) toward the vehicle body upper side and inclined perpendicularly to the side away from the attachment portion of the loading member (the flange portion 20C of the metal plate member 20). That is, the meaning of the term "inclined" in the first aspect of the present invention encompasses cases that are inclined while curving as in the above exemplary embodiment and also encompasses cases of inclination in perpendicular shapes as in this variant example.

As a further variant example of the above exemplary embodiment, the end face (34A) of each extended end portion (34) may face toward the vehicle body upper side and to the side toward the attachment portion of the loading member (the flange portion 20C of the metal plate member 20), or may face perpendicularly upward. That is, the meaning of the term "faces toward the vehicle body upper side" in the second aspect of the present invention encompasses cases of facing perpendicularly upward and also encompasses cases of facing diagonally upward in the vehicle body as in the above exemplary embodiment and the like.

As a further variant example of the above exemplary embodiment, in a case in which, for example, the upper end of the inclined portion of the extended end portion is higher than a height level at which the extended end portion is expected to strike against an obstacle on a road surface, a structure may be employed such that the extended end portion is further inflected from the upper end of the inclined portion and extends horizontally to the opposite side from the side thereof at which the attachment portion of the loading member is disposed, and the end face of the extended end portion is a vertical surface. That is, the extended end portion may be formed in a "Z" shape. In the case of this variant example, the end face of the extended end portion is perpendicular with respect to a general surface of the support plate, as a result of which processing is easier.

As a further variant example of the above exemplary embodiment, a structure may be employed in which an extension portion that extends in a direction orthogonal to the inclined portion of the support plate is provided at the loading member, from the attachment portion toward the support plate, and a recess portion in which the upper end portion of the inclined portion of the support plate is accommodated is formed in a lower face side of the extension portion.

As a further variant example of the above exemplary embodiment, the upper end of each inclined portion (40) may be configured to be disposed at the same height as the upper end of the adhesive layer (24), and may be configured to be disposed at a height that is at the vehicle body lower side relative to the upper end of the adhesive layer (24).

As a further variant example of the above exemplary embodiment, the filling portion (26) that is interposed between the inclined portion (40) and the attachment portion of the loading member (the flange portion 20C of the metal plate member 20) and that is joined together with the adhesive layer (24) may be structured of a solid material (a solid) such as an adhesive or the like that is different from the adhesive of the adhesive layer (24). Further, a structure may be employed in which the filling portion 26 is not provided.

As a further variant example of the above exemplary embodiment, the attachment portions of the loading members (the flange portions 20C of the metal plate members 20) that are placed on the support portions (32) of the support plate (the stack frame 30) may be fixed to the support portions (32) of the support plate (the stack frame 30) by bolt-fastening or the like without the adhesive layers (24) being interposed.

As a still further variant example of the above exemplary embodiment, a structure may be employed in which the directions of orientation of the fibers arranged in the curved portion (38) are random.

The exemplary embodiments described above and the numerous variant examples mentioned above may be embodied in suitable combinations.

Hereabove, an example of the present invention has been described. The present invention is not limited by these descriptions, and it will be clear that numerous modifications outside of these descriptions may be embodied within a technical scope not departing from the spirit of the invention.

The disclosures of Japanese Patent Application No. 2013-137428 are incorporated into the present specification by reference in their entirety.

The invention claimed is:

1. A vehicle body lower portion structure comprising:
a loading member disposed below a floor of a vehicle; and
a support plate including
    a flat plate-shaped support portion that is formed in a plate shape of a fiber-reinforced resin material, an attachment portion of the loading member being placed on and fixed to the support portion, and
    an extended end portion extending from the support portion, an inclined portion being formed at the extended end portion, the inclined portion being inflected toward a vehicle body upper side from the support portion or a projected portion of the support portion, and the inclined portion being inclined to a side away from the attachment portion of the loading member,
    wherein a lower face of the attachment portion of the loading member is fixed to the support portion of the support plate via an adhesive layer,
    an upper end of the inclined portion is configured to be disposed at a height that is at the vehicle body upper side relative to an upper end of the adhesive layer, and
    a filling portion is provided that is interposed between the inclined portion and the attachment portion of the loading member, and that is joined together with the adhesive layer.

2. The vehicle body lower portion structure according to claim 1, wherein an end face of the extended end portion faces toward the vehicle body upper side.

3. The vehicle body lower portion structure according to claim 1, wherein
    the inclined portion is formed by a curved portion being formed at the extended end portion, the curved portion being inflected in a curve shape from the support portion or the projected portion of the support portion, and a lower face side of the curved portion being the diametric dimension outer side thereof, and
    an orientation direction of fibers arranged in the curved portion is configured to be along a curvature direction of the curved portion.

* * * * *